No. 628,595. Patented July 11, 1899.
G. S. BARROWS.
APPARATUS FOR TRIMMING WELSBACH OR OTHER INCANDESCENT MANTLES.
(Application filed Nov. 23, 1898.)
(No Model.) 2 Sheets—Sheet 1.
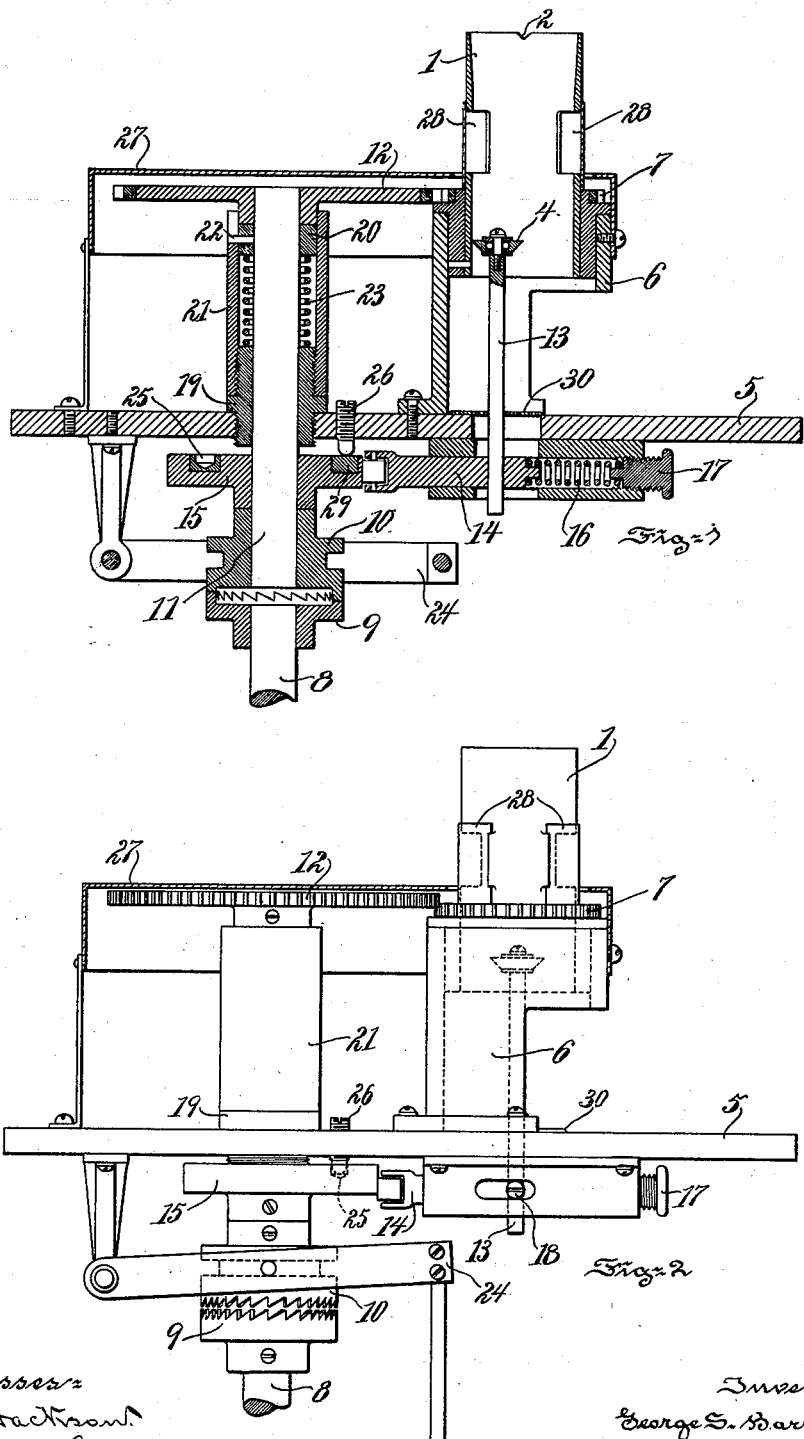

No. 628,595. Patented July 11, 1899.
G. S. BARROWS.
APPARATUS FOR TRIMMING WELSBACH OR OTHER INCANDESCENT MANTLES.
(Application filed Nov. 23, 1898.)
(No Model.) 2 Sheets—Sheet 2.

Witnesses:
W. R. Jackson
K. W. Gilligan

Inventor
George S. Barrows
By
Augustus B. Stoughton
Attorney

UNITED STATES PATENT OFFICE.

GEORGE S. BARROWS, OF PHILADELPHIA, PENNSYLVANIA, ASSIGNOR TO THE WELSBACH LIGHT COMPANY, OF GLOUCESTER CITY, NEW JERSEY.

APPARATUS FOR TRIMMING WELSBACH OR OTHER INCANDESCENT MANTLES.

SPECIFICATION forming part of Letters Patent No. 628,595, dated July 11, 1899.

Application filed November 23, 1898. Serial No. 697,217. (No model.)

*To all whom it may concern:*

Be it known that I, GEORGE S. BARROWS, a citizen of the United States, residing at the city of Philadelphia, in the county of Philadelphia and State of Pennsylvania, have invented certain new and useful Apparatus for Trimming Welsbach or other Incandescent Mantles, of which the following is a specification.

In the manufacture of Welsbach and other incandescent mantles it is necessary or desirable to trim them so that they shall be of uniform or approximately uniform height and finish, and heretofore this operation has been accomplished manually.

It is the object of the present invention to trim mantles by means of machinery, and to thus effect not only the consequent saving, but also to increase the accuracy and neatness of the work.

To these and other ends the invention, stated in general terms, comprises a tubular receptacle, holder, or carrier within which the mantle depends, a cutter adapted to coöperate with the internal wall of the receptacle, holder, or carrier, and means for rotating one of these parts in respect to the other.

The invention further comprises the improvements hereinafter described and claimed.

The nature, characteristic features, and scope of the invention will be more fully understood from the following description, taken in connection with the accompanying drawings, forming part hereof, and in which—

Figure 4:
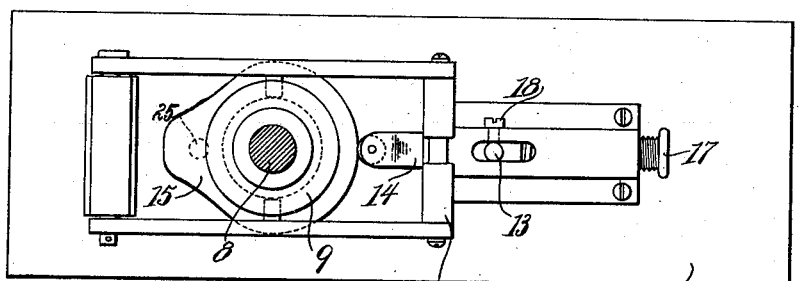
Figure 3:
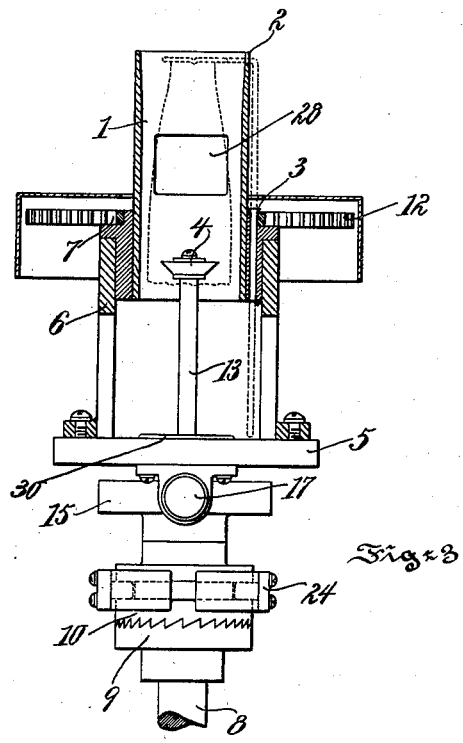

Figure 1 is a sectional view illustrating apparatus embodying features of the invention and showing the parts in position for trimming. Fig. 2 is a side view, partly in section, of the same, showing the parts in position for permitting of the application and removal of a mantle. Fig. 3 is an elevational view, partly in section, taken from right to left in Figs. 1 and 2; and Fig. 4 is a view looking upward at the bottom of the machine.

In the drawings, 1 is a receptacle, holder, or carrier into which the mantle or incandescent to be operated upon depends. As shown, it is of generally tubular form and is notched, as at 2, and provided with a socket, as 3, for the accommodation of the particular type of mantle-support indicated by dotted lines in Fig. 3. Of course the mantle or incandescent may be otherwise supported, so as to depend within the part 1, and the size and general appearance of the part 1 may be varied within wide limits so long as its interior wall performs the function of a support or backing, in connection with which a cutter may operate.

4 is a cutter that extends into the interior of the mantle or incandescent.

One of the parts 1 and 4 is rotated in respect to the other, and means are provided for bringing them into contact so as to cut off the lower portion or skirt of the mantle and for permitting them to separate from each other in order to permit of the application and removal of the mantle or incandescent.

A description will now be given of means well adapted for the accomplishment of the above-described results.

5 is a base, frame, or table of any shape and character adapted to carry and properly support the other parts of the apparatus. The housing 6, connected with or made part of the base 5, constitutes a bearing in which the receptacle, holder, or carrier 1 is afforded freedom of rotary motion. As shown in Fig. 1, the receptacle, holder, or carrier 1 is pinned or otherwise connected with a gear or toothed wheel 7, which in its turn revolves in the bearing of the housing 6.

8 is a shaft to which power is applied in any appropriate manner, and it is connected with one member 9 of a friction-clutch. The other member 10 of this friction-clutch is keyed or otherwise connected with a shaft 11. The upper end of the shaft 11 is keyed or otherwise connected with a gear or toothed wheel 12, which meshes with the toothed wheel 7 and serves to impart rotary motion to the receptacle, holder, or carrier 1 when the parts of the clutch are in connection with each other, as shown in Fig. 1, and to permit the receptacle, holder, or carrier to remain at rest when the parts of the clutch are separated from each other, as shown at Fig. 2. The cutter shaft, spindle, or head 13 is connected with a follower 14, that coöperates with a cam 15, pinned or otherwise attached to the shaft 11. As shown, use is made of a spring 16 for holding the follower 14 up to its cam. The spring 16 may be adjusted by means of the thumb-screw 17, and the height of the cutter may be adjusted by means of the set-screw 18. A high part on the cam operates to cause the follower 14 to shift the cutter clear of the internal wall of the receptacle, holder, or carrier, as shown in Fig. 2, so that a mantle may be caused to depend between the cutter and the internal wall of the receptacle, holder, or carrier. A low part on the cam permits the spring 16, as well as the resilience of the part 13, to force the cutter into contact with the internal wall of the receptacle, holder, or carrier, with the result that it severs the lower portion of the mantle or incandescent. As shown, the cutter is mounted upon ball-bearings and, as above stated, the pressure with which it is thrust against the internal wall of the receptacle, holder, or carrier can be increased or diminished by adjustment of the thumb-screw 17. The proportion of the parts shown in the drawings is such that the receptacle, holder, or carrier makes two revolutions for each revolution of the shaft 11. In this way complete severing of the lower part of the mantle is insured. The shaft 11 and the parts 12, 15, and 10 rigidly connected therewith are mounted to turn in bearings 19 and 20. The bearing 19 is connected immovably with the part 5, and the bearing 20 is mounted to slide, but not turn, in a sleeve 21, connected with the bearing 19. The pin-and-slot connection 22 permits the bearing 20 to slide, but not turn.

23 is a spring mounted within the sleeve 21 and tending normally to lift the bearing 20, the toothed wheel 12, the shaft 11, the cam 15, and member 10 of the clutch upward, so that the latter clears the constantly-moving member 9 of the clutch.

24 is a clutch or shipper lever adapted to be operated by means of a pedal or in any appropriate manner, so as to overcome the spring 23 and pull down the shaft 11, in order to cause the member 10 of the clutch to engage the member 9 thereof. As soon as this has been done the shaft 8 operates to drive both the cam 15 and the receptacle, holder, or carrier 1.

The top of the cam 15 may be provided with a depression 25, into which takes a stud 26 only when they are in line with each other and when the upper member 10 of the clutch is out of engagement with the lower member 9 thereof. In consequence of these provisions it follows that as soon as the member 10 has been drawn downward and the parts have been set in motion, as described, the stud 26 rides on top of the cam and holds it and its connected parts down until the cam has made one revolution, whereupon the depression 25 again comes in line with the stud, thus permitting the spring 23 to lift the members of the clutch out of engagement, with the result that the receptacle, holder, or carrier comes to rest, as does also the cam, and the cam is so proportioned that when it comes to rest its high part is in position for holding the cutter clear of the internal wall of the receptacle, holder, or carrier.

A case, as 27, may be provided for inclosing the gears, and the carrier 1 may be provided with movable doors, as 28, that are useful in affording access to its interior and to the cutter. To avoid undue wear upon the top of the cam, the same may be provided with an inlaid hard-metal ring, as 29, in which the depression 25 may be advantageously formed. By providing the shank of the stud 26 with a thread it may be conveniently made adjustable.

From the foregoing description it is clear that the cutter-spindle 13 must be afforded a range of motion, and for this purpose a slot is provided in the base or frame 5. To prevent the severed or detached material from falling through this slot, use is made of a washer or cover-plate 30, which is provided with an opening through which the part 13 extends and which is afforded freedom of sliding motion on top of the base 5. The front or other convenient portion of the housing 6 is cut away below the cutter, so as to afford a space through which the severed portions of the mantle or incandescent may be removed.

The mode of operation of the foregoing apparatus may be described as follows: Assuming the machine to be at rest and the shaft 8 to be in motion, the parts occupy the positions shown in Fig. 2. The attendant in charge then places a mantle or incandescent in such position that its skirt depends between the cutter and the internal wall of the receptacle, holder, or carrier. In the construction chosen for illustration this can be readily accomplished by inserting the side support through the socket 3 and permitting it to hang in the notch or seat 2, as indicated by dotted lines in Fig. 3. The attendant then draws down the clutch or shipper lever 24, for example, by momentarily depressing the pedal connected therewith. The effect of this is to draw down the cam 15 clear of the stud 26 and to set the cam and the receptacle, holder, or carrier in motion. The stud 26 holds the parts in depressed position during one revolution, whereupon it enters the receptacle 25 and the machine is automatically brought to rest, as described. During this revolution the cutter has been brought to bear upon and has cut off the lower portion of the mantle, as has been hereinabove set forth, and has been returned to its original position, so that the mantle can be readily removed after the completion of the trimming operation. The attendant in charge again rapidly repeats the described operation, so that many mantles can be accurately trimmed in a very short time.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. Apparatus for trimming tubular bodies comprising a receptacle, holder or carrier and its complemental cutter rotatable the one in respect to the other and constructed and arranged to permit the body to depend between them, and means for rotating one of said parts in contact with the other, substantially as described.

2. Apparatus for trimming mantles or incandescents comprising a tubular receptacle, holder or carrier for the mantles or incandescents rotatable in respect to the cutter, a cutter mounted within the receptacle, holder or carrier, means for rotating the receptacle, holder or carrier, and devices for shifting the cutter into and out of contact with the internal wall of the receptacle, holder or carrier, substantially as described.

3. Apparatus for trimming mantles or incandescents comprising a tubular receptacle, holder or carrier, a cutter within the same, a shaft provided with a wheel for rotating said receptacle, holder or carrier and with a cam and its connections for shifting said cutter, and a clutch and its driving-shaft, substantially as described.

4. Apparatus for trimming mantles or incandescents comprising a tubular receptacle, holder or carrier, a cutter within the same, a shaft provided with a wheel for rotating the receptacle, holder or carrier and with a cam and its connections for shifting the cutter, a clutch for applying power to said shaft, a spring tending to throw said clutch in one direction, and a stud and its complemental recess for governing the action of the spring, substantially as described.

5. In a machine for trimming mantles the combination of a tubular receptacle, holder or carrier, means for rotating the same, a cutter-spindle provided with a cutter disposed within said carrier and afforded range of motion in a slot in the bed of the machine, and a cover-plate or washer fitted to the spindle and adapted to bridge the slot and to slide on the bed, substantially as described.

6. In a machine for trimming mantles the combination of a tubular receptacle, holder or carrier, a cutter within said receptacle, a spring for positioning the cutter, a cam and its follower opposing the spring, and means for rotating the cutter and the receptacle, the one in respect to the other, substantially as described.

In testimony whereof I have hereunto signed my name.

GEO. S. BARROWS.

In presence of—
F. H. MACMORRIS,
W. J. JACKSON.